Dec. 2, 1969     HATSUTARO OGAWA     3,481,305
STITCH PATTERN INDICATOR FOR A SEWING MACHINE
Filed June 23, 1967
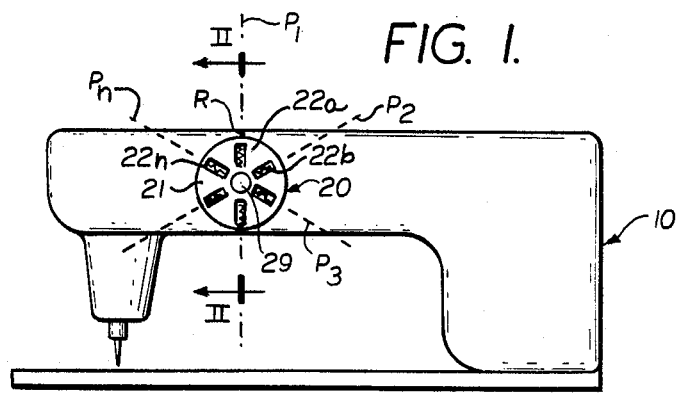
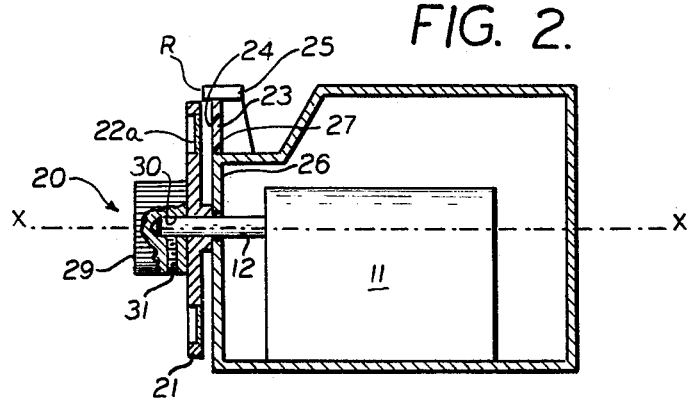
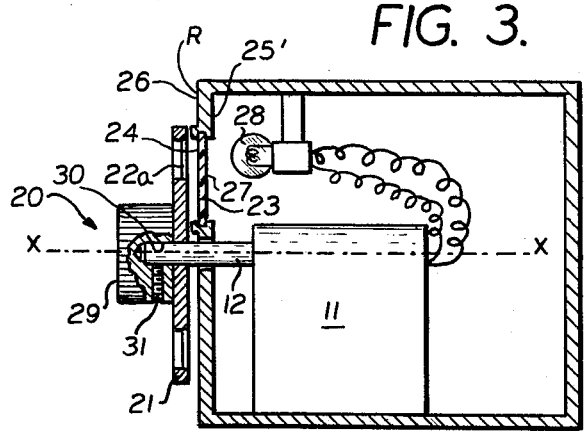
INVENTOR
HATSUTARO OGAWA
BY
ATTORNEYS.

United States Patent Office 3,481,305
Patented Dec. 2, 1969

3,481,305
STITCH PATTERN INDICATOR FOR A
SEWING MACHINE
Hatsutaro Ogawa, Tokyo, Japan, assignor to Nelco Corp.,
New York, N.Y., a corporation of New York
Filed June 23, 1967, Ser. No. 648,463
Int. Cl. G09f 9/00; D05b 3/02
U.S. Cl. 116—124                                    10 Claims

ABSTRACT OF THE DISCLOSURE

A stitch pattern indicator for a sewing machine in which any one of a plurality of available sewing stitch patterns can be selected by rotating a moveable control member to an index position corresponding to the selected pattern, the specific pattern established by the control member in each case being visually identified by a characteristic stencil on a dial connected to the control member and moveable therewith to align the stencil corresponding to the pattern associated with the control member index position with an illuminated reference position on the sewing machine.

---

The present invention relates to a stitch pattern indicator for a sewing machine of the type commonly known as a "zig-zag" machine in which any one of a plurality of available sewing stitch patterns can be selected. Such machines are generally well known in the prior art and their stitch pattern regulating mechanisms are likewise well known.

In general, the stitch regulating mechanisms effect control of the sewing stitch pattern produced by means of cams which are specially contoured for each particular pattern. Earlier zig-zig machines were adapted for multiple pattern operation by means of interchangeable cams, and to change from one pattern to another it was necessary to physically replace individual cams. Current models of zig-zag machines dispense with the need for individual cam replacement by providing stitch regulating mechanisms having a plurality of pattern control cams which can be individually selected by rotating a movable control member to an index position corresponding to the desired pattern. It therefore has become necessary in the case of such same selection machine to provide some means by which the operator can readily identify for any given control member index position the specific stitch pattern that will be produced, and to simply determine to which index position the control member must be rotated to produce a desired stitch pattern.

The invention provides a stitch pattern indicator which fulfills the aforesaid needs and which has a dial connected to the stitch regulating mechanism control member for movement therewith, this dial having a plurality of translucent stencil portions each representing a corresponding stich pattern. The stencil portions preferably are geometrically similar to the stitch patterns they represent, and are each arranged for alignment with a reference position on the sewing machine when the control member is rotated to the index position corresponding to the same pattern as represented by the stencil portion aligned with the reference position.

At this reference position, the invention provides means defining a contrasting background surface with respect to the dial is opaque except for its stencil portions, which contrasting background surface is visible through the stencil portion aligned with the reference so as to visually distinguish that stencil from all others on the dial, thereby unequivocally identifying the stitch pattern established by the control member.

To enhance the distinction of the stencil at the reference position, the background surface is preferably illuminated other than by such ambient light as is transmitted through the translucent stencil and reflected back therethrough by the background surface. Such illumination can be achieved by using a translucent mask of a distinguishing color as the background surface, which mask is illuminated either by ambient light incident upon its back side or by a lamp or any other suitable illuminating means.

According to a preferred embodiment of the invention, the dial is opaque except for its stencil portions, which are expediently transparent rather than merely translucent, and the dial is of such dimensions as to shield the contrasting background surface except for such portions thereof as are visible through the stencil aligned with the reference position.

The stitch pattern indicator of the instant invention also provides a knob which is connected to the dial to accommodate manual rotating of the control member to its various index positions. However, in such machines wherein the control member can be rotated by other than manual means, the knob can be omitted, thus rendering the dial as a pure read-out indicator device.

It is therefore an object of the invention to provide a stitch pattern indicator which will follow the rotating of a sewing machine stitch regulator to visually identify the specific sewing stitch pattern established thereby.

Another object of the invention is to provide a stitch pattern indicator as aforesaid having pattern identifying stencils arranged in an order corresponding to the layout of the stitch regulator control member index positions which establish the patterns represented by said stencils.

A further object of the invention is to provide a stitch pattern indicator as aforesaid wherein the stencil corresponding to the pattern established at each control member index position is aligned with a reference position on the sewing machine whenever the control member is rotated to such index position.

Still another and further object of the invention is to provide a stitch pattern indicator as aforesaid in which the stencil aligned with the reference position is illuminated in a contrasting color with respect to the dial itself and all other stencils thereof.

Other and further objects and advantages of the invention will become apparent from the following detailed description and accompanying drawing in which:

FIG. 1 is a front elevation view of a sewing machine having a stitch pattern indicator according to a preferred embodiment of the invention.

FIG. 2 is a section view of the sewing machine and stitch pattern indicator of FIG. 1 taken along line II—II therein.

FIG. 3 is a section view of a sewing machine and stitch pattern indicator according to another embodiment of the invention, taken similar to the sectional view of FIG. 2.

In FIGS. 1 and 2 is shown for purposes of example, a sewing machine 10 having a stitch regulating means 11 which enables any one at a time of a plurality of sewing stitch patterns to be selected by rotataing a rotatable control member 12 to the index position of a plurality of angularly spaced index positions $P_1$, $P_2$, $P_3$ ... $P_n$ which corresponds to the selected pattern.

The stitch pattern indicator 20 of the invention has a dial 21 which is connected to the control member 12 for rotation therewith, this dial 21 being generally opaque except for a plurality of stencil portions 22a, 22b . . . 22n which are translucent and may also be transparent. Each of the stencil portions 22a–22n represents a corresponding stitch pattern, and said stencils 22a–22n are arranged in an angular spacing relation to one another about the combined dial 21 and control member 12 rotation axis X which is the same as the angular spacing relation among the index positions $P_1$–$P_n$ for the same stitch patterns. Thus, when control member 12 is set at any particular index position $P_1$–$P_n$, the stencil 22a–22n which identifies the stitch pattern produced at such index position setting will be aligned with a reference position R on the sewing machine 10.

To afford a clearer visual distinction between the stencil, as for example stencil 22a, which is aligned with reference position R, and the other stencils 22b–22n, the invention provides means in the form of a screen 23 disposed at reference position R to define thereat a contrasting background surface 24 with respect to the dial 21. Background surface 24 is disposed in underlying relation to dial 21 and is visible through stencil 22a, or any other stencil 22b–22n which is alternately aligned with reference position R. The screen 23 is preferably of translucent material such as plastic, i.e. Lucite, polystyrene etc., and can be transparent but not necessarily so. Where screen 23 is translucent and its background surface 24 is of a distinguishing color, for example red, the identification of the pattern represented by such stencil 22a can be made more vivid by illuminating screen 23 and by making stencils 22a–22n in a configuration geometrically similar to the patterns which they represent.

Illumination of screen 23 can be accomplished either by the use of ambient light, as in the embodiment represented by FIGS. 1 and 2, or by using artificial light as in the embodiment represented by FIG. 3.

For ambient light illumination, the screen 23 is supported by an apertured frame 25 which extends outward from the sewing machine housing wall 26 so that the ambient light normally present during operation of sewing machine 10 will be incident upon the back surface 27 of screen 23 and will illuminate the front, or background surface 24 thereof.

In this way, a somewhat simpler overall construction can be achieved.

However, with a hollow sewing machine housing, the screen 23 can be supported in an apertured frame 25' defined by the housing wall 26, as shown by FIG. 3, and a lamp 28 located within the machine housing and positioned behind screen 23 is then employed to illuminate the screen 23.

Since the rotatable control member 12 is in effect a shaft, the dial 21 can be connected to a knob 29, or constructed integral therewith, which knob 29 is connected to control member 12, as by a hollow bore 30 and set screw 31, so as to accommodate manual rotating of control member 12 to its various index positions $P_1$–$P_n$.

The radial spacing distance between screen 23 and control member 12 rotation axis X is preferably made large enough so that the stencils 22a–22n when laid out at the same radius on dial 21, and at the angular spacings established by the index positions of control member 12, can be large enough to be clearly visible at normal operating distances. Thus, for closely spaced angular separations between control member 12 index positions $P_1$–$P_n$, the radial dimension between axis X and the stencils 22a–22n and the screen 23 is made larger than for wider angular separations between control member 12 index positions $P_1$–$P_n$.

Because one of the primary objectives of the invention is to provide a stitch pattern indicator 20 which affords a clear and distinct visual indentification of the sewing stitch pattern that will be produced for each control member 12 setting, the dial 21 is preferably opaque except for its stencil portions 22a–22n, and said dial 21 is of such dimensions as to shield the illuminated screen 23 except for such portions of its surface 24 as are visible through the stencil aligned with reference position R, and said screen 23 and the opaque portions of dial 21 are preferably of distinctively different colors.

As can be appreciated from the foregoing, the construction details of the stitch pattern indicator 20 according to the invention can be varied to suit the needs of a particular application, in such ways as will become obvious from the disclosure herein. However the invention intended to be limited only by the following claims in which have endeavored to claim all inherent novelty.

What is claimed is:

1. In a sewing machine having stitch regulating means whereby any one of a plurality of available sewing stitch patterns can be selected by rotating a moveable control member to an index position corresponding to the selected pattern, a sewing stitch pattern indicator which comprises a dial connected to said control member for movement therewith, said dial having a plurality of translucent stencil portions each representing a corresponding stitch pattern, said stencil portions being each arranged for alignment with a reference position on the sewing machine when said control member is rotated to the index position corresponding to the same stitch pattern as represented by the stencil portion in alignment with said reference position, and means defining at said reference position a contrasting background surface with respect to said dial and disposed in underlying relation thereto, said contrasting background surface being visible through such translucent stencil portion as is in alignment with said reference postion to visually distinguish said stencil portion from other stencil portions of said dial and thereby identify the stitch pattern established by said control member.

2. The sewing stitch pattern indicator according to claim 1 including means for illuminating said contrasting background surface to further distinguish the stencil portion aligned with said reference position from other stencil portions of said dial.

3. The sewing stitch pattern indicator according to claim 1 wherein each of said stencil portions are geometrically similar to the stitch patterns which they represent.

4. The sewing stitch pattern indicator according to claim 1 wherein said control member is rotatable relative to the sewing machine about a predetermined axis to assume any one at a time of a plurality of angularly spaced index positions, and said dial is disposed for rotation in unison with said control member and has a similar plurality of stencil portions arranged at substantially the same radial distance from said rotation axis and in substantially the same angular spacing relation to one another as said control member index positions.

5. The sewing stitch pattern indicator according to claim 4 including a knob connected to said dial to accommodate manual shifting of said control member to its various index positions.

6. The sewing stitch pattern indicator according to claim 4 wherein the means defining said contrasting background surface includes a translucent screen supported by the sewing machine in underlying relation to said dial and at substantially the same radial distance from said rotation axis as said stencil portions, and including lamp means supported by said sewing machine and disposed to illuminate said screen.

7. The sewing stitch pattern indicator according to claim 5 wherein the means defining said contrasting background surface includes a translucent screen and an apertured frame connected to said sewing machine and extending therefrom to support said screen at said reference position for illumination by ambient light.

8. The sewing stitch pattern indicator according to claim 6 wherein said sewing machine has a hollow housing having an aperture disposed to receive and support said screen, and said lamp means includes a lamp disposed within said housing and positioned behind said screen to illuminate same.

9. The sewing stitch pattern indicator according to claim 6 wherein said dial is opaque except for said translucent stencil portions and shields said illuminated screen except for such portions thereof as are visible through the stencil portion in alignment with said reference position.

10. The sewing stitch pattern indicator according to claim 9 wherein said screen and the opaque portions of said dial are of distinctive colors.

References Cited

UNITED STATES PATENTS

| | | | |
|---|---|---|---|
| 2,885,992 | 5/1959 | Roberts et al. | 116—124.4 |
| 2,983,248 | 5/1961 | Steinke | 116—124.4 |
| 3,034,461 | 5/1962 | Urscheler | 112—158 |
| 3,053,207 | 9/1962 | Adler | 112—158 |
| 3,229,654 | 1/1966 | Eguchi | 112—158 |
| 3,395,593 | 8/1968 | Sawada | 74—569 |

LOUIS J. CAPOZI, Primary Examiner

U.S. Cl. X.R.

112—158; 116—133